G. B. GRAY.
ELECTRICAL CONTROL SYSTEM FOR LOCOMOTIVES.
APPLICATION FILED APR. 25, 1912.

1,200,101. Patented Oct. 3, 1916.
3 SHEETS—SHEET 3.

Witnesses

Gardner B. Gray Inventor
by
Attorneys

UNITED STATES PATENT OFFICE.

GARDNER B. GRAY, OF PITTSBURGH, PENNSYLVANIA, ASSIGNOR, BY MESNE ASSIGNMENTS, TO AUTOMATIC TRAIN CONTROL & SIGNAL COMPANY, OF PITTSBURGH, PENNSYLVANIA, A CORPORATION OF DELAWARE.

ELECTRICAL CONTROL SYSTEM FOR LOCOMOTIVES.

1,200,101.  Specification of Letters Patent.  Patented Oct. 3, 1916.

Application filed April 25, 1912. Serial No. 693,156.

*To all whom it may concern:*

Be it known that I, GARDNER B. GRAY, a citizen of the United States, residing at Pittsburgh, in the county of Allegheny and State of Pennsylvania, have invented a new and useful Electrical Control System for Locomotives, of which the following is a specification.

The present invention relates to improvements in electrical control systems for locomotives, the primary object of the invention being the provision of a low voltage primary circuit established through the rails of a system and the wheels of the locomotive and tender, for normally energizing a plurality of electromagnets or relays, whereby a secondary or higher voltage circuit carried by the locomotive is normally closed under all running conditions, but which has disposed therein and operably connected to the air brake system of the locomotive and train, air controlled time valves, whereby a signal is actuated within the cab due to the reception of a caution signal, said signal being exposed for a predetermined period, a plurality of co-acting time valves being further provided for actuating the circuits under emergency or danger conditions to bring the train to a halt within a longer period of time, thus providing a means whereby the engine man may stop the locomotive and train in such period or be automatically stopped.

A further object of the present invention is the provision of a speedometer control mechanism, which is so disposed with relation to the circuit carried by the locomotive as to prevent the automatic stopping of the train when running below a certain speed, but which when the locomotive is beyond the certain speed will establish certain electrical connections that will permit of the emergency stopping of the locomotive due to danger conditions.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 1:
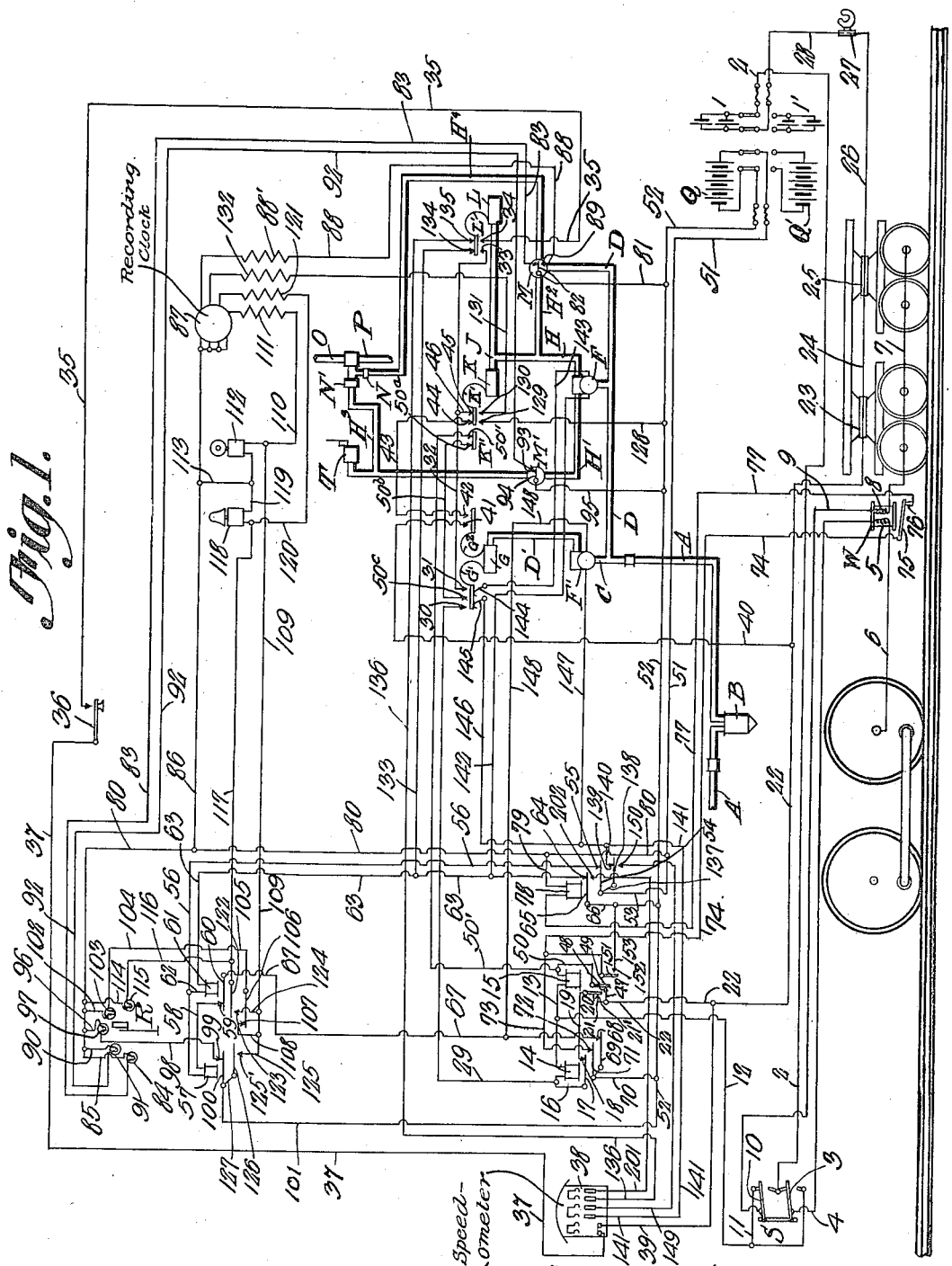
Figure 2:
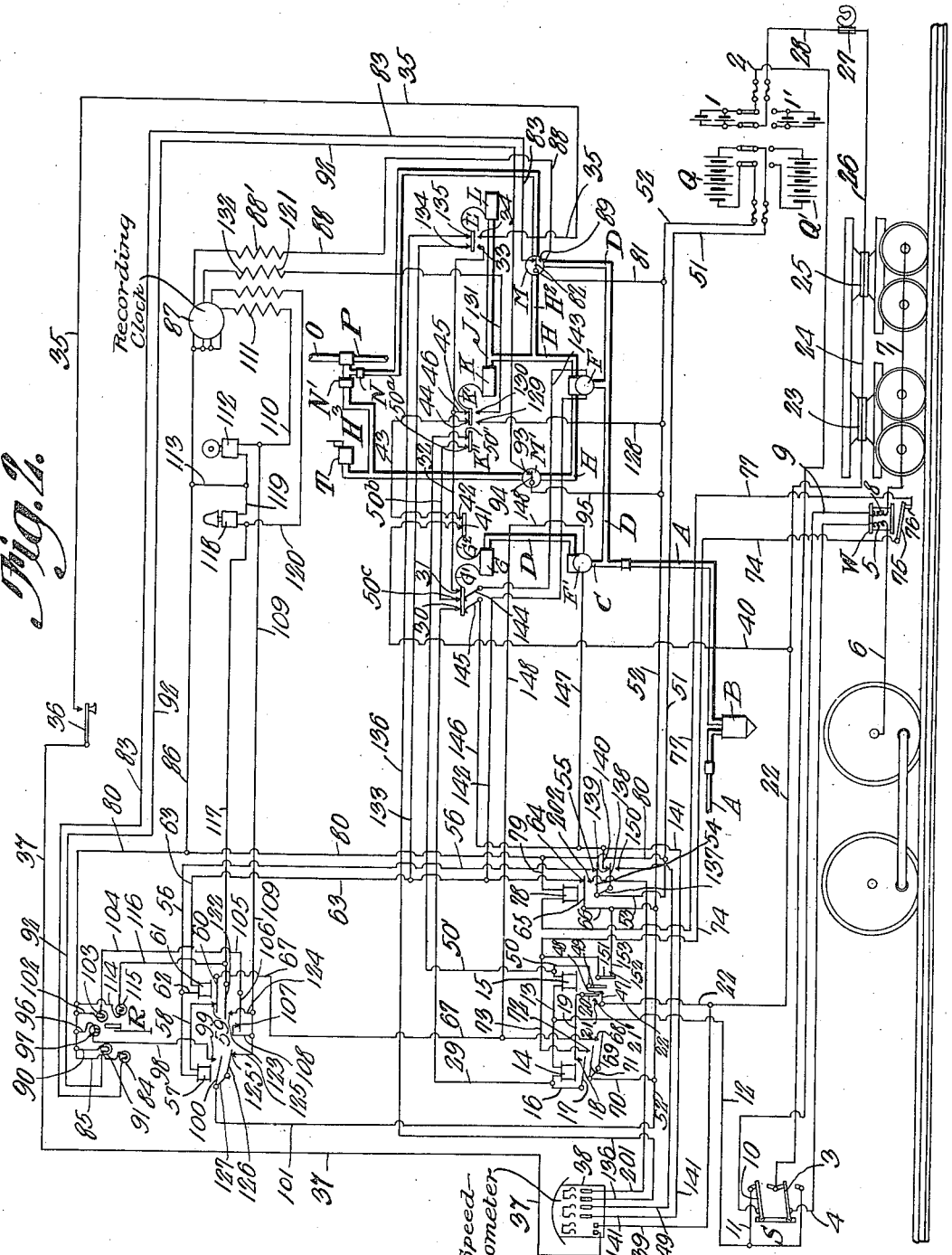
Figure 3:
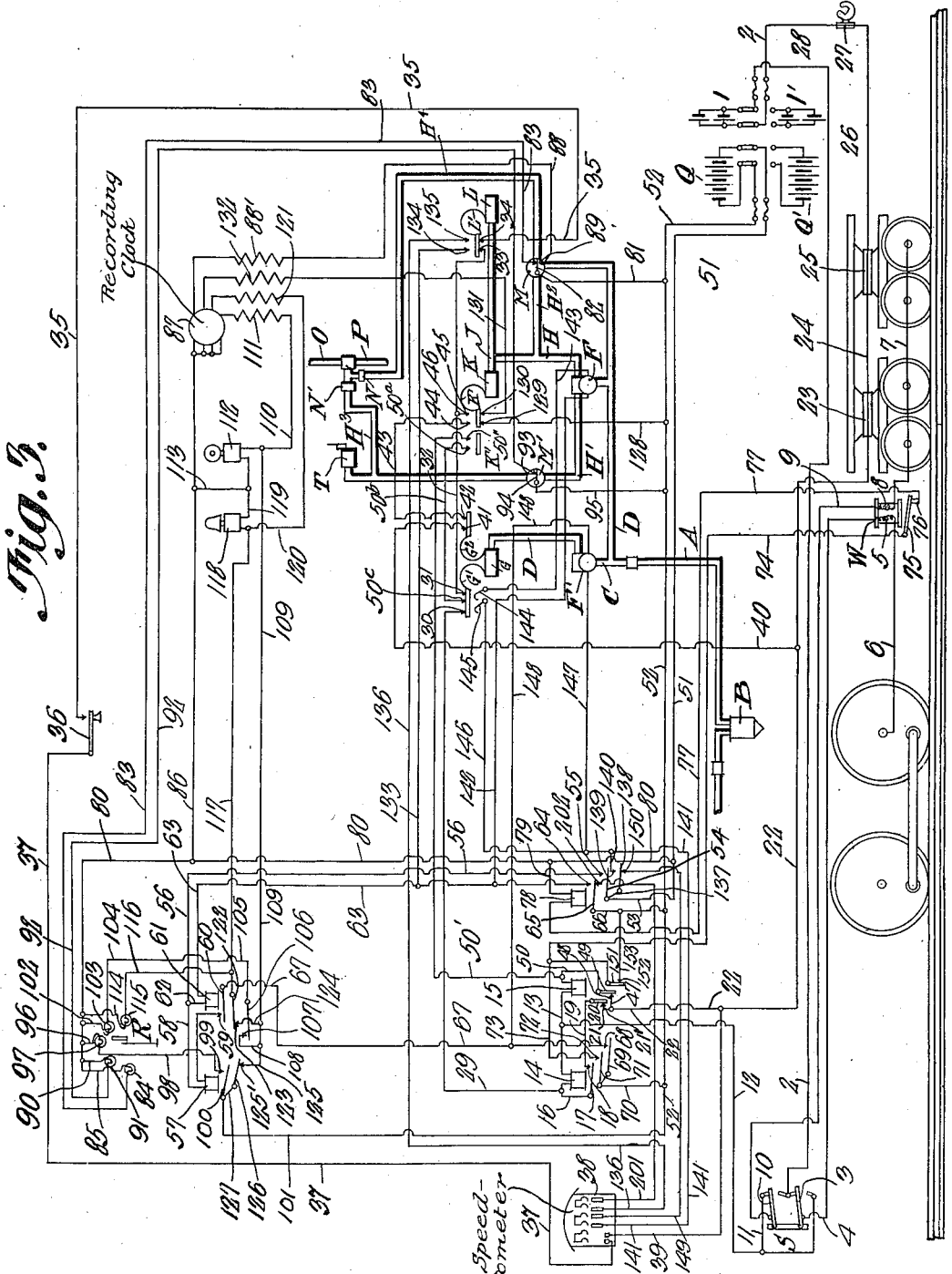

In the drawings Figure 1 is a diagrammatic view of the cab carried circuit with the various instruments controlled thereby when under normal running conditions. Fig. 2 is a similar view with the caution time valve actuated after having received a caution signal. Fig. 3 is a similar view with the parts in the position they assume after having received a danger signal.

Referring to the drawings, the numerals 1 and 1' designate the low voltage primary batteries, two being provided in case of breakage or non-efficiency of one of the said batteries, and said batteries being of low voltage to prevent the creeping of the current from one insulated rail or sections of rails to the other, it having been found in practice that the preferable voltage used is 1.2 volts.

Leading from the positive side of either one of the batteries 1 or 1' is a conductor 2 which is connected to one member 3 of the reversing switch S to which is connected the conductor 4 leading to one coil 5 of the differential relay W. A conductor 6 leads from the coil 5 to the wheels of the locomotive and through the tracks to the wheels of the tender and establishes a circuit with the conductor 7 and the other coil 8 of the differential relay. A conductor 9 leads from the coil 8 of the differential relay, to the other member 10 of the reversing switch. A conductor 11 is connected to the member 10 of the reversing switch and by means of the conductors 12 and 13 an electrical connection is established with the caution relay 14 and the polarized relay 15.

A circuit for energizing the caution relay 14 is continued through the conductor 16, the armature 17, which under normal conditions, that is when the caution relay 14 is energized, is placed in electrical connection with the contact point 18 which has led thereaway from the conductor 19. The armature 20 which is normally energized by the polarized relay 15 is connected to the conductor 19 and as clearly shown in Fig. 1, is placed in engagement with the contact point 21 from which leads the conductor 22. This conductor 22 is led to the metal plate 23 disposed between plates of insulation and carried by the truck, while led thereaway from is the conductor 24 connected to a similar metal plate 25, the conductor 26 being led from the metal plate 25 through the insulated metal plate 27 carried by the draw bar of the tender. The conductor 28 is led away from the metal plate 27 to the negative side of the battery 1 and thus completes the circuit for normally energizing the caution relay 14 from the batteries 1.

Shunted from the conductor 16 is a conductor 29 which is connected to the front contact point 30 disposed in position to be engaged by the contact point carried by the Bourdon tube G' of the time valve G, the contact 31 being disposed to be bridged with the contact point 30 to establish a circuit through the conductor 32, and as will presently appear through the contacts 33 and 34 and conductor 35. The conductor 35 has disposed therein the engineer's key 36, which has led thereaway from the conductor 37, which as clearly shown is connected to the speedometer 38.

The speedometer is so constructed and arranged that under normal conditions when the locomotive is running at a speed above approximately eight miles to normally place the various electrical connections in such positions as to permit of the operation of the signal system due to caution or danger signal, but when running under eight miles an hour to prevent the automatic stop of the locomotive due to the reception of danger signals, the detailed operation of which will be set forth later on.

The applicant does not wish to restrict himself to the use of the terms "caution" and "danger" but will also make use of the term "permissive" in referring to the caution signaling means, and the term "absolute" in referring to the danger signaling and the train stopping mechanism. He will also make use of the term "train controlling means" in referring to the train stopping mechanism and of the term "traffic controlling means" in referring to either signaling means or train stopping means.

A conductor 39 is led away from the speedometer 38 and is shunted with the conductor 22 and thus completes a circuit with the batteries 1 or 1' and includes the speedometer 38. Bridged from the conductor 22 is a conductor 40 which has connected at the other terminal a contact point 41, which forms a front contact for the switch carried by the Bourdon tube G² of the time switch G and which as will later appear is bridged with the contact point 42 and the conductor 43 to at the proper time form an electrical connection through the contacts 44 and 45 and the conductor 46 with the conductor 32. The conductor 22 has bridged therefrom a conductor 47 whose contact 48 when the polarized relay 15 is energized, is normally engaged by the armature 49, from which is led a conductor 50, the conductor 50' being connected to the conductor 50 and having at its other terminal the contact point 50" which as will later appear when the Bourdon tube K" of the time switch K is expanded will bridge the contacts 50" and 50ᵃ to place into electrical connection the short conductor 50ᵇ and its contact 50ᶜ disposed in the position to be engaged by the switch carried by the Bourdon tube G' of the time switch G.

The above set forth circuit constitutes the circuit completed by the primary batteries 1 or 1' which are effected primarily by the caution or danger conditions produced in the rails of the system to affect the electrical connection of the locomotive or tender wheels therewith.

Carried by the locomotive are the two sets of higher voltage storage batteries Q and Q', two sets of batteries being employed, so that an operable set will be always in position for connection to the main control circuits of the locomotive, and led away from the batteries are the main conductors 51 and 52, the conductor 51 of which constitutes the main return for all of the various high voltage circuits. These batteries Q and Q' are preferably, as has been demonstrated by practice, of 12 volts capacity. Under normal conditions, the time valve G is not under pressure, while the time valves K and L are under pressure, thus placing the switches of the respective time valves K and L in position to bridge the respective contacts 50"—50ᵃ, 44—45, and 134—135.

Connected to the conductor 51 is a conductor 53 which is connected to the armature 54, which due to the energization of the danger electromagnet 78, as will later appear, is bridged to engage the contact 55 and through the conductor 56 energize the electromagnet 57, the conductor 58 leading from the electromagnet 57 to the contact 59, which due to the energization of the electromagnet 61, as will presently appear, is bridged by the armature 60. The conductor 62 is bridged from the conductor 56 through the electromagnet 61 and led from the electromagnet 61 is a conductor 63 to the contact point 64. As before stated, under normal conditions, the electromagnet 78 is energized so that the armature 65 is placed in engagement with the contact 64 thus establishing electrical connection through the armature 65. The conductor 66 is led away from the armature 65 and is bridged to the main conductor 52 which in turn is connected with the battery Q. A conductor 67 is led away from the armature 60 controlled by the electromagnet 61 and has its other terminal connected to a front contact 68 which is disposed in the path to be engaged by the armature 69 normally held closed by the caution relay or electromagnet 14, said armature 69 being connected through the medium of the conductor 70 to the main conductor 52 of the battery Q. Connected to the conductor 70 is another armature 71 which is normally held in engagement with the front contact 72 due to the energization of the caution relay 14 and establishes electrical connection through the conductors 73 and 74 which leads to the armature 75 controlled by the differential relay W. The contact 76 is normally in the path to be engaged by the armature 75 and thus forms a proper electrical connection with the conductor 77 which is led to and includes in said circuit the main or danger relay 78 which has led thereaway from the conductor 79 connected to the main conductor 80, which in turn is connected to the return conductor 51 of the secondary battery Q. By this means the danger relay or electromagnet 78 is energized from the high voltage or secondary batteries Q, while the caution relay 14 and the polarized relay 15 are energized from the primary batteries 1 or 1'.

The train pipe A, which constitutes a portion of the train control apparatus, has disposed therein the air washer B for cleansing the lubricating oil from the air so as not to affect the various magnet valves F and F' which are also connected to the train pipe A through the conduits D and C respectively. The magnet valve F', as will presently appear, controls the caution time valve G which has the air conduit D' led from the caution magnet valve F' to the caution time valve G. Led from the danger or magnet valve F are the oppositely disposed air conduits H and H', which as clearly shown, lead to the respective time valves K and L and to the throttle control T. From the train pipe H is a train pipe air conduit H², which leads through the cut-out valve M and to the brake valve N, a similar conduit H' leading through the cut-out valve M', and through the branch conduit H³ to the second brake valve N'. The brake valves N and N' are arranged to control the pressure in the train pipe O—P.

The cut-out valve M has led thereto, a conductor 81 from the main conductor 52 of the batteries Q through the switch 82, which when in normal running condition is placed in engagement with the front contact of the conductor 83, said conductor 83 being led thereaway from and having connected thereto, the blue lamp 84 which indicates to the engineman when the automatic brake control is in service. The conductor 85 is led away from the lamp 84 and is connected to the branch conductor 80 of the battery Q, thus establishing a circuit as described.

Leading from the conductor 80 is a branch conductor 86 which includes the recording clock 87, said recording clock being so positioned as to keep a record of the various signals received, both as to caution or as to whether or not, the engineman has automatically stopped or disregarded the signal by opening the cut-out valve M to prevent an automatic stop. Led away from the recording clock 87 is a conductor 88 which has bridged therein the resistance 88', the other terminal of the conductor 88 being connected to the back contact 89 disposed in the path to be engaged by the switch 82 of the cut-out valve M, the purpose of which will presently appear.

A conductor 90 is bridged from the conductor 80 and has connected thereto the yellow light 91 which indicates when the automatic control T has been placed in service. The conductor 92 leads away from the yellow light 91 and is provided with a front contact 93, which is disposed in the path to be engaged by the switch 94 of the cut-out valve M', a conductor 95 being connected to the switch 94 and to the main conductor 52 of the batteries Q. By this means the secondary batteries Q will energize at the proper time, as will presently appear, the blue light 84 and the yellow light 91.

Bridged from the conductor 80 is a short conductor 96 which has connected thereto the white lamp 97, the conductor 98 being led away from the lamp 97 to the contact point 99 which under normal conditions, the relay 57 being energized, is engaged by the armature 100, which has led thereaway from the conductor 101. This conductor 101 is formed as a continuation of the main battery conductor 52, thus providing a means whereby the white light 97 of the repeater R receives its current from the secondary battery Q. Also bridged from the conductor 80 is a short conductor 102 which has connected therein, the green light 103, which has the conductor 104 led thereaway from and is connected by means of the conductor 105 to the armature 106, which due to the energization of the relay 61 is normally held in engagement with the contact 107. This contact 107 is connected through the medium of the conductor 108 to the conductor 109 which leads through the conductor 110 and the resistance 111 to the recording clock 87, which indicates when the lamp 103 is energized. Bridged from the conductor 110, is the caution alarm bell 112 whose conductor 113 is bridged with the conductor 86, thus causing the actuation of the bell 112 under caution conditions, simultaneously with the recording thereof by the clock 87.

A conductor 114 is bridged from the conductor 80 and is connected to the red or danger light 115 of the repeater R and led away from the light 115 is the conductor 116 which is connected to the conductor 117. This conductor 117 is led to the danger audible alarm or bell 118 which has led thereaway from the conductor 119 and is thus bridged through the conductor 113 with the conductor 86. Leading from the conductor 117 is a conductor 120 which is led through the resistance 121 to the recording clock 87, so that the recording clock will be actuated simultaneously to indicate at what time the danger condition was effected upon the circuits of the system.

Under normal conditions with the relay 61 energized, the armature 122 is held away from and out of contact with the back contact point 123, but as will presently appear, the circuit formed will be through the conductor 124 with short conductor 125 and the armature 126 which due to the deënergization of the electromagnet 57 will be in engagement with the back contact 125' and thus connect the conductors 124 and 125 with the conductor 101 which is connected as a continuation of the main conductor 52 of the batteries Q.

The rear contacts 129 and 130 are in a position to be bridged by the switch carried by the Bourdon tube K' of the time valve K when in danger condition, and as the rear contact 129 is connected through the conductor 128 to the conductor 52 of the battery Q, the circuit will be completed through the conductors 52 and 128, rear contacts 129 and 130 and the conductor 131 through the resistance 132 to the recording clock 87 and finally through the conductors 86 and 80 to the return conductor 51 of the batteries Q. Thus the time of collapse of the Bourdon tube K' will be indicated by the recording clock 87.

Under normal conditions a circuit is closed by the Bourdon tube L' at the front contacts 134 and 135, thus including the conductors 133 and 136, which as shown are connected respectively to the conductor 63 and to the speedometer 38. A conductor 141 is led away from the speedometer 38 and through the branch conductor 140 and front contact 139 will establish a circuit through the armature 138, conductor 137 and conductor 53 which as before stated is connected with the main conductor 51 of the batteries Q. Under normal conditions the armature 138 will be held against the contact 139 by the energization of the electromagnet or relay 78. Bridged from the conductor 63 is a conductor 142 which is connected to one side of the danger magnet valve F, while led thereaway from is a conductor 143 through the contact 144 which is disposed in the path to be engaged by the switch carried by the Bourdon tube G' of the time valve G. Under normal conditions the time valve G as before stated is not under pressure so that the switch carried thereby and controlled by the Bourdon tube G' will bridge the resilient contacts 144 and 145, and thus connect danger time valve F in electrical continuity with the battery Q, as the conductor 146 is connected similarly to the conductor 141 to the main return conductor 51 of the batteries Q.

The caution magnet valve F' which is energized through the conductor 147 is bridged with the conductor 141 and the conductor 148, which is bridged with the conductor 67, thus placing said electromagnet valve F' under the control of the secondary batteries when the caution relay 14 is energized and the armature 69 is bridging to engage the front contact 68.

Led away from the speedometer 38 is a conductor 149 which is connected to the back contact 150 disposed in the path to be engaged by the armature 138 when the electromagnet 78 is deënergized. The armature 151 is normally controlled by the polarized relay 15 and held out of contact with the back contact 152 which is connected by means of a branch conductor 153 to the conductor 66 and thereby to the main conductor 52 of the batteries Q.

From the foregoing description, it is evident that the time valves L and K are controlled by the magnet valve F and are held normally under pressure from the main pipe line A leading through the air washer B, there being conducted to the magnet valve F connected to the valve chambers of the time valves L and K, whereby the train pressure is normally held in the Bourdon tubes L' and K' so that the switches carried by the respective tubes L' and K' will be placed in engagement with the forward or upper contacts thereof as clearly shown in Figs. 1 and 2. It will thus be seen that any operation of the magnet valve F that releases the air from the Bourdon tubes L' and K' or any break in the pipe line A leading thereto will result in the Bourdon tubes collapsing and the switches carried thereby moving away from the front contacts and closing the circuits controlled by the back contacts 33—34 and 129—130.

The time valve G as clearly shown, controls the two Bourdon tubes G'—G² and the switches carried thereby and is operated through the magnet valve F' which as before stated is connected to the same supply line leading from the air washer B. However, the pipe line leading from the magnet valve F' to the valve G is connected to the other side of the magnet valve F' than is the valve F so that the time valve G is normally not under pressure, so that the Bourdon tubes G' and G² are collapsed and the switches carried thereby, contact the resilient contact points 144 and 145.

As before described, the combination cab relay which consists of three independent relays, is assembled in one casing and so disposed, that the relays 14 and 15 are controlled by the primary batteries 1 or 1' and the emergency or danger relay 78 is controlled by the secondary battery Q or Q'.

In describing the operation of the system first will be described the receiving of a caution signal in the cab and the resultant operation of the mechanism and the restoring of same to their normal position after the elapsing of a set period of time adjustable but here spoken of as 12 seconds. Second will be described the receiving of a danger signal and its resultant automatic operation of the throttle closing and brake applying mechanism and the process of releasing the brakes after the train has been brought to a full stop and a set period of time elapsed adjustable but here spoken of as 25 seconds. Third will be described the speed control feature, whereby the throttle closing and brake applying mechanism are made inoperative when the speed of the engine is below a certain predetermined miles per hour, here spoken of as 8 miles per hour, at the time of receiving a danger signal. Fourth will be described the feature for protecting against crosses or grounds to any of the secondary electrical circuits, and which might be the cause of a false clear engine signal at the time when a danger signal should be received.

Whenever a caution signal has been received due to the engine passing over a pair of insulated joints around which is connected a master battery whose polarity is reversed to the low voltage primary battery carried on the engine the relay 14 becomes deënergized and the armatures 17, 71, and 69 controlled thereby drop, opening the electrical circuits which they control. At the same time, the relay 15 which is a polarized relay has been reversed by the master track battery thus reversing its armatures 20, 49, and 151 controlled thereby to the back contacts, by so doing the circuit for relay 78 is still maintained and it remains normally closed, thus holding all of the equipment controlled through the armatures of the relay 78 in normal position.

When the caution relay 14 becomes deënergized and its armatures drop the circuit leading from the high voltage battery Q to magnet valve F' is opened thus deënergizing valve F'. (Fig. 2). Now when valve F' becomes deënergized, a port is opened so that air flows from pipe C to D', thus air is forced into time valve G inflating the Bourdon tubes G' and G² so to move these armatures into engagement with the front contacts 30—31 and 50ᶜ, 41 and 42 respectively the contacts 144 and 145 following and remaining in contact with G'.

The time valve G is so constructed and arranged as to not distend the Bourdon tubes G' and G² sufficient to close the front contacts 30—31—50ᶜ and 41—42 until 12 seconds has elapsed from the time of the deënergizing of magnet F', thus both the caution visible and audible signals are given in the cab for this length of time after a caution signal has been given. A record is also made by clock 87. When the Bourdon tubes have been extended and the front contacts 30—50ᶜ—31 and 41—42 have been closed, a circuit from primary battery 1 through the coils of relays 14 and 15 is closed and which bridges around the stick contacts 18 and 48, thus these relays are reënergized and their armatures picked up to their normal position, and magnet valve F' is in turn reënergized shutting off the flow of air to time valve G. The Bourdon tubes G' and G² settle back to their normal position. When relays 14 and 15 were restored to normal, the caution visible and audible signals were discontinued by the circuits to light 103 and bell 112 being opened.

The circuits formed due to the reception of a caution signal, are as follows: From Fig. 1 it is clear that relays 14 and 15 are normally energized by current flowing from primary battery 1 along conductor 2, reversing switch 3, conductor 4, coil 5 of the differential relay W, conductor 6, engine drivers, track and tender wheels to conductor 7, through coil 8 of relay W, conductor 9, reversing switch 10, conductors 11 and 12 to relay 14, conductor 16, armature 17, contact 18, conductor 19, armature 20, contact 21, conductors 21', 22, 24, 26 and 28 back to battery 1. Also from conductor 12, current will flow along conductor 13, through polarized relay 15, conductor 50, armature 49, contact 48, conductor 47, to conductor 22 and as before back to battery 1. Now when the engine passes over a pair of insulated joints the above circuit is opened between engine drivers and the tender wheels, but at the same time the track equipment has placed a master battery around these insulated joints. As its voltage is higher and its polarity reversed to that of primary battery 1, current flows in the above mentioned circuit in the reversed direction. This reversal of the flow of current deënergizes relay 14 and its armatures 17, 69 and 71 drop as it is a stick relay. Relay 15 being polarized, its armatures 20, 49 and 151 are reversed.

Normally current flows from secondary battery Q, along conductors 52 and 70, armature 69, contact 68, conductors 67 and 148, magnet valve F', conductors 147 and 140, contact 139, armature 138, conductors 137, 53 and 51 back to battery Q. When armature 69 of relay 14 dropped, this circuit was opened, thus magnet valve F' became deënergized and a port was opened so that air flowed from pipe C to time valve G.

Also by the dropping of the armature 71 of relay 14, the circuit leading to relay 78 was opened but at the reversal of polarized relay 15, current flows from secondary battery Q along conductors 52, 66, and 153, contact 152, armature 151, conductor 74, armature 75, contact 76, conductor 77, relay 78, conductors 79 and 51 back to battery Q thus relay 78 is still energized and its armatures remain up and any circuits passing through them kept completed. After a lapse of 12 seconds, the engine having passed off from over the insulated joints and the armatures of time valve G due to the inflation of the Bourdon tubes G' and G², have moved upwardly and closed the front contacts, 30, 31, and 50ᶜ also 41 and 42. Current will now flow from primary battery 1, along conductor 2, reversing switch 3, conductor 4, coil 5 of relay W, conductor 6, engine drivers, track and tender wheels, to conductor 7, coil 8, conductor 9, reversing switch 10, conductors 11, 12, relay 14, conductor 29, contacts 30 and 31, conductors 32 and 46, contacts 45 and 44 of time valve K, conductor 43 contacts 42 and 41, conductors 40, 22, 24, 26 and 28, back to battery 1. Thus relay 14 is energized and its armatures lifted to their normal position. At the same time, current will flow from battery 1 to conductor 12, as before, along conductor 13 polarized relay 15, conductor 50', contacts 50'' and 50ᵃ, of time valve K, conductor 50ᵇ, contacts 50ᶜ and 31 to conductor 32 and as before, back to battery 1. As this current flows in the normal direction through relay 15, its armatures 20, 49 and 151 will be restored to their normal position. When relay 14 is reënergized current will flow to magnet valve F' over its normal path as follows: from battery Q along conductors 52 and 70, armature 69, contact 68, conductor 67, and 148, magnet valve F', conductors 147 and 140, contact 139, armature 138, conductors 137 and 51 to battery. Magnet valve F' becoming reënergized, the flow of air from A to time valve G is shut off and thus the Bourdon tubes G' and G² move out of engagement with the front. The restoring of the armature of polarized relay 15 opens the circuit to relay 78 but as relay 14 is now energized, relay 78 will be energized over its normal path as follows: from battery Q along conductors 52 and 70, armature 71 and contact 72 of relay 14, along conductors 73 and 74, armature 75, contacts 76, conductor 77, relay 78, conductors 79, 80, and 51 back to battery Q.

Upon the reception of a caution signal and armature 69 of relay 14 drops, the secondary circuit leading to relay 57 is opened, thus it becomes deënergized and its armatures 100 and 126 drop. This opens the circuit leading to the clear signal light 97 and it is thus extinguished. At the same time, we find a circuit leading from battery Q along conductors 52, 101 and 127, armature 126, contact 125', conductors 125 and 108, contact 107, armature 106, conductors 105 and 104, caution signal light 103, conductor 102, 80 and 51 to battery. This establishes a visual caution signal. Also there is a circuit from conductor 125 along conductor 109, audible caution alarm 112, conductors 113, 86, 80 and 51 back to battery Q. Also from conductor 109 along conductor 110, resistance 111, recording clock 87, conductors 86, 80 and 51 back to battery. Therefore visual and audible caution signals are given and a record made of the receiving of a caution signal.

From the foregoing description of the operation of the time valve G, it will be seen that the front contacts 30, 31, 50ᶜ and 41—42 of the Bourdon tubes G' and G² are employed to control the time in which it is desired to automatically restore the relays 14 and 15 after a caution signal has been received. The time of the operation of the various time valves is controlled entirely by the size of the ports in the by-passes of said time valves, the same being so adjusted that the various conditions required of them will be met.

When a danger signal is received in the cab, the circuit is opened that controls the two relays 14 and 15, due to the engine passing over a pair of insulated joints round which, there is no by-pass for the current to flow. This condition on the track is set forth in the patent to Gardner B. Gray No. 909,083, dated January 5th, 1909. This opening of the circuit deënergizes relays 14 and 15, causing the armatures of 14 to drop, but as the relay 15 is polarized, its armatures remain in their original position. The dropping of armature 71 of relay 14, opens the circuit leading to relay 78 but in this case, another path is not established for it by the reversal of relay 15 as was in the case when a caution signal was received, thus the relay 78 becomes also deënergized, and its armatures drop, and the circuits controlled by them are opened. Under this condition, both magnet valves F and F' become deënergized, that is when the train is running at a speed above the predetermined speed, in the present instance eight miles per hour. The operation of F' will be the same as previously described. As the magnet valve F controls the air circuits leading to the throttle closer T and the brake valves N and N', upon its becoming deënergized, air flows to the throttle closer which closes the throttle valve, also air flows to the brake valve N' setting the brakes. Now in the normal running condition, the air pressure flows from D, which is connected to train line, through magnet valve F, pipe H to time valves K and L so that they are normally under pressure and their Bourdon tubes expanded. Air also flows from H through cut out valve M, to brake valve N, which is so arranged that air pressure above a diaphragm seats a valve which prevents the air in train line conduit O—P from lifting said valve and escaping to the atmosphere. Now when F is deënergized, the port from D to H is closed, and H is opened to the atmosphere. At the same time, a port is opened leading from D to H'. Air now flows through H' to cut out valve M', conduit H³, to brake valve N' which is so arranged that air pressure in N' unseats a valve allowing the air in train line conduit O—P to escape to the atmosphere. Air can also flow from H³ to the piston of throttle closer T.

When it is desired to cut the system out of service, the cut out valves M and M' are turned to their cut out position. This in the case of M' closes the port from H' to H³ and in the case of M, the port from H² to H⁴ is closed, and a port from D to H⁴ opened. It is therefore seen that the throttle closing and brake applying apparatus are operated by interrupting the free passage of the primary current by the introducing of a pair of insulated joints between the engine drivers and tender wheels,—this interrupting of the primary current, deënergizes relay 14, which interrupts the flow of the secondary current to relay 78 and magnet valve F' and relay 78 in turn interrupts the flow of current to the magnet valves F. The time valve L is adjusted so that the Bourdon tube actuated thereby, is not fully deflated until the lapse of 25 seconds after the pressure is once removed, by the deënergizing of magnet valve F. The time valve K is so adjusted that its Bourdon tubes are wholly deflated in five seconds after the pressure has been removed. In this way, the automatically picking up of the combination relays 14, 15 and 78, by time valve G at the end of 12 seconds, as described in the case of the receiving of a caution signal, is prevented as time valve K at the end of five seconds has opened contacts 44—45 and also 50'' and 50ª, which are a part of that circuit. By this means, there is no possibility of the reënergization of the relays 14 and 78 when the time valve G has operated. Time valve L not making its back contacts for at least thirteen seconds later, that is a period of 25 seconds from the reception of the danger signals, the throttle closer or brakes can not be released until that length of time even should the train be stopped with the speedometer at zero speed position and the engineer has closed his key 36. On the other hand the throttle and the brake mechanism cannot be released until the train has been brought substantially to a full stop with the speedometer at zero speed position.

Since the armatures 20—49 and 151 of the polarized relay 15 did not leave the front contacts connected to the wire 22, the polarized relay 15 remained normally charged after the engine passed over the broken insulated joint, and as soon as the contact was made by the engineer's key 36, the relay 14 also became energized, at the same time and immediately closed the circuits controlling the magnet valve F' and the relay 78, which as before stated controls the magnet valve F. This permitted the automatic equipment to take its normal working position (Fig. 1) and time valves L—K and G each resumed their normal position, thus closing all circuits which they control, the valves L and K being under pressure, while the valve G is not under pressure. It will thus be seen that the primary function of the three time valves L, K and G is to automatically control the pick up of the caution signal within twelve seconds from the time the signal was received, and at the same time to automatically remove the possibility of picking up the relays 14 and 78 when a danger signal is received until after the elapse of twenty-five seconds from the reception thereof, and the train has come to a stop and the speedometer contacts for zero speed are closed.

Upon the reception of a danger signal and the relay 78 deënergized, its armature 54 drops, thus opening the secondary circuit leading from the relays 57 and 61, and thus they are deënergized and their respective armatures drop. By the dropping of armature 100 of relay 57, the circuit to the clear signal light 97 is broken and it is thus extinguished. At the same time we find a circuit from battery Q along conductors 52, 101 and 127, armature 126, contact 125', conductors 125 and 124, contact 123, armature 122, conductors 116, danger light 115, conductors 114, 80 and 51 back to battery. Also from conductor 116 along conductor 117, audible danger alarm 118, conductors 119, 113, 86, 80 and 51 back to battery. Also from conductor 117, along conductor 120, resistance 121, recording clock 87, and conductors 86, 80 and 51 to battery Q. Therefore visual and audible danger signals are given and a record made of the receiving of a danger signal.

Upon the reception of a danger signal the time valve K is deflated, so that its armature bridges the contacts 129 and 130, there is established a circuit from battery Q along conductors 52 and 128, contacts 129 and 130, conductor 131, resistance 132, recording clock 87, conductors 86, 80 and 51 back to battery Q. This current energizes clock 87 in such a manner that a record is made of the time of the operation of the throttle closing and brake applying apparatus. The indicator R is so attached to the armatures of the relays 57 and 61, that it repeats by position the various visual light signals.

Taking up now the speed control feature whereby the throttle closing and brake applying mechanism are made inoperative at the time of receiving a danger signal provided the speed is below 8 miles per hour. In this case, there is a circuit to magnet valve F which shunts around the combination relays 14, 15 and 78, and which is as follows: (Fig. 1) from battery Q, along conductors 52, 66, armature 65, contact 202, relay 78 being deënergized, conductor 201, contacts of speedometer 38 made below 8 miles per hour, conductor 136, contacts 135 and 134 of time valve L, conductors 133, 63 and 142, magnet valve F, conductor 143, contacts 144 and 145 of time valve G, conductors 146 and 141, contacts of speedometer 38 made below 8 miles per hour, conductor 149, contact 150 and armature 138 of relay 78, conductors 137, 53 and 51 back to battery. By this means, the possibility of setting the brakes when the train is moving at a slow speed is prevented, but the visual and audible signals will be given just the same as if the train were running at a high speed.

Although it has been stated that the maximum speed under which the speedometer will exercise a control over the stopping mechanism is eight miles per hour, it is evident that the mechanism may be set for actuation at various speeds and that the time for actuation of the various time valves may be regulated according to the conditions required. The object of carrying wires 133 and 136 through the front contacts 134 and 135 of time valve L is to avoid reënergizing the magnet valve F, till the train has come to a full stop after an automatic application of brakes. Since the time valve L normally closes the contacts 134 and 135 and immediately breaks them upon the deënergization of the magnet valve F, as a consequence of the reception of a danger signal when the train is moving about eight miles per hour, there is removed all possibility of the shunt circuit, just described, from establishing itself when the speed of the train falls below eight miles per hour while the same is being braked or brought to a standstill, and thereby preventing the magnet valve F from being reënergized so that the train could proceed at low speed regardless of the danger indication.

In protecting against grounds and crosses to the different electrical circuits, it will be seen that the low voltage battery 1 controls what might be termed the primary circuit only, that is, namely those which operate the relays 14 and 15. One side of this battery must of necessity be grounded to the engine frame, so in order to insure against any false operation of any of the various apparatus due to a cross or ground on one side of the battery an independent and higher voltage battery is provided to supply the necessary current for the operation of the various instruments as relay 78, the indicator relays 57 and 61, the signal lights 84, 91, 97, 103 and 115, the audible alarms 112, and 118, the recording clock 87 and the magnet valves F and F'. The circuits leading to these various mechanisms are considered as the secondary circuits.

Protection is provided against a false indication due to a ground or cross that might occur at any point on the primary circuit by the differential relay W. The detail description and operation of which is set forth in a copending application filed. However, the conductor 40, leading to the time valve G is broken by a set of contacts 41 and 42 in order to provide an additional precaution in preventing short circuits leading to the pick up conductors of the primary circuit. The short circuit may occur between the conductors 43 and 50' owing to the close proximity of the terminals located on the Bourdon tube K. In the event of such a short circuit, without the provision of the break at the contact points 41 and 42 between the conductors 40 and 43, a danger signal would not be received by the engine owing to the pick-up conductor 50' being directly connected with the negative side of the battery 1 through the conductor 40, and the Bourdon tube $G^2$ was installed to bridge the contact points 41 and 42 when the conductor 50' is to be energized. Under normal conditions, as shown in Fig. 1, the front contacts of the Bourdon tube K are in contact and the back contacts of the Bourdon tube G' are in contact with the wiping contact members 144 and 145, as will be hereinafter explained, while the contacts 41 and 42 are open. In case a caution signal should come in the engine, relay 14 will be reënergized within 12 seconds, or after the contacts 30, 31 and $50^e$ are bridged by the Bourdon tube G', and the contacts 41 and 42 are bridged by the Bourdon tube $G^2$, regardless of the short circuit between the conductors 50' and 43. Also a danger signal will be received even though the short circuit is between the conductors 43 and 50', for the reason that the magnet valve F will become deënergized and Bourdon tube K will then have opened its contacts as well as breaking the circuit 146 at points 144 and 145 before contact points 41 and 42 are made, thus insuring a danger or a caution signal even though the above-mentioned short circuit exists.

It will be seen that the various circuits leading from secondary battery Q have both the positive and negative conductors carried through an armature of relay 78, so that in case a danger signal is received in the cab, both the positive and negative conductors of secondary battery Q will be broken or opened from the entire operating equipment, except when the train is traveling at a speed lower than eight miles per hour. This breaking of both the positive and negative conductors insures that all wiring leading to any equipment becomes dead and absolutely open circuited on the deënergizing of relay 78.

Upon one of the tubes of time valve G is arranged a set of long wiping back contacts 144—145, which are normally held closed under all positions of the armature of the Bourdon tube G', except when the front contacts 30—31 and 50° have been bridged and forced back nearly to a stop pin where just before reaching the stop pins, the back contacts 144—145 are opened. Now through these contacts, is carried the control of danger magnet valve F. When a caution signal is received and magnet valve F' deënergized and the tubes G' and G² inflated, the contacts 144 and 145 will not be opened for as soon as the armature of G', bridges contacts 30—31 and 50°, which it will do some little time before the armature reaches the stop pins, the relays 14 and 15 are at once picked up and magnet valve F' energized, and thus the tubes G' and G² collapse back to their normal position. But should a wire leading to magnet valve F' become broken, then the armatures of time valve G continue to move after having made contacts at 30—31 and 50° or until the armature strikes the back position; this opens the contacts 144—145, thus opening the circuit controlling the magnet valve F, which in turn controls the throttle and sets the brakes, so that the train is brought to a stop similarly to the operation when a danger signal is received. Were it not for this arrangement only a momentary indication of either a danger or caution signal would be received should a wire leading to magnet valve F' become broken. Therefore it is seen that all the engine wiring is automatically protected against possible crosses or grounds, thus insuring protection against a false clear indication.

While herein is described the invention in detail, and is illustrated a combination embodying various features, which may at times be used to advantage, it is not the desire or intention of claimant to be limited to the particular arrangement shown, or to an arrangement embodying the various auxiliary features, except as particularly pointed out in the appended claims.

What is claimed is:

1. A system of traffic control including: a permissive traffic controlling means, an absolute traffic controlling means, a circuit controlling both of said means, means controlling said circuit to selectively operate said controlling means, means for automatically resetting said permissive controlling means after a predetermined interval and means for automatically placing said absolute controlling means in condition to be reset after a greater predetermined interval.

2. A system of traffic control including: a permissive traffic controlling means, an absolute traffic controlling means, a circuit controlling both of said means, means controlling said circuit to selectively operate said controlling means, means for automatically resetting said permissive controlling means after a predetermined interval and means for automatically placing said absolute controlling means in condition to be manually reset after a predetermined interval.

3. A system of train control comprising: a train and train controlling means thereon, a circuit on the train having a source of electrical energy, means for reversing and rupturing the normal flow of the current in said circuit, a second circuit on the train having a source of electrical energy and immediately controlling the operation of the train controlling means, a caution indication means on the train, a relay in said first-mentioned circuit to cause the indication means to operate when the polarity of said circuit is reversed, and a polarized relay in said first-mentioned circuit exercising a control over the second circuit to prevent the train controlling means from operating when the first-mentioned circuit is reversed and to cause the same to operate when said first-mentioned circuit is ruptured.

4. A system of train control comprising: a train and train controlling means thereon, a primary circuit on the train having a source of electrical energy, means for reversing and rupturing the normal flow of the current in said circuit, a caution indicating means on the train, secondary circuits on the train having a secondary source of electrical energy and having certain of said circuits feeding the train controlling means and said caution indicating means, a caution relay in said primary circuit controlling the caution indicating means and causing the same to operate when the polarity of the primary circuit is reversed, a danger relay in another of said secondary circuits and controlling the flow of current through the remainder of said secondary circuits, said caution relay controlling the flow of current to said danger relay when the polarity of the primary circuit is reversed, a normally open shunt circuit, and a polarized relay in the primary circuit adapted to close said shunt circuit when the current in the primary circuit is reversed and thereby feed current to the danger relay.

5. A system of train control comprising: a train, a primary circuit on the train having a source of electrical energy, means for reversing and rupturing the normal flow of the current in said circuit, controlling mechanism on the train, secondary circuits on the train fed from a secondary source of electrical energy having certain of said circuits controlling said mechanism, a danger relay in another of said secondary circuits and controlling the flow of current through said secondary circuits controlling the train mechanism, a relay in the primary circuit and controlling the current through said circuit of the danger relay, a normally open shunt in said circuit of the danger relay, and a polarized relay in the primary circuit adapted to close said shunt when the current in the primary circuit is reversed and thereby feed current to the danger relay.

6. A system of train control comprising: a train, train controlling means thereon, a primary circuit on the train having a source of electrical energy, means for reversing and rupturing the normal flow in said circuit, a primary relay in said circuit, a circuit breaker in said circuit and controlled by said relay and adapted to open said circuit when the current through said relay is reversed or interrupted, a caution indicating means on the train, secondary circuits on the train fed from a secondary source of electrical energy having certain of said circuits feeding the train controlling means and said caution indicating means, a circuit breaker in said caution indicating circuit under the control of said primary relay, a danger relay in one of said secondary circuits, a circuit breaker in the circuit of said danger relay and under the control of said primary relay, circuit breakers in the circuits feeding the train controlling means under the control of said danger relay, a shunt in the circuit of the danger relay around said primary relay, and means in the primary circuit adapted to close said shunt when the current in the primary relay is reversed whereby the continuity of the danger relay circuit is continued.

7. In a system of train control, train controlling means, signaling means, automatic means for operating said train controlling means and said signaling means, speed controlled means for preventing the operation of said train controlling means when the train is running below a predetermined speed but permitting the operation of said train controlling means when the train is running above a predetermined speed, and means for restoring the train controlling means to normal condition after a predetermined interval.

8. In a system of train control, train controlling means, signaling means, automatic means for simultaneously operating said train controlling means and said signaling means, speed controlled means for preventing the operation of said train controlling means but permitting the operation of said signaling means when the train is running below a predetermined speed and means for restoring said signaling means after a predetermined interval.

9. In a system of traffic control, a primary circuit, a secondary circuit having branches, traffic controlling means in a branch of said secondary circuit, restoring means for said traffic controlling means in said primary circuit, a speed controlled means included in said primary circuit and a branch of said secondary circuit, whereby the speed controlled means will control the operation of said train controlling means and said restoring means.

10. A system of train control, comprising: a traffic track, a train, train controlling devices, a normally closed train controlling circuit, means including a circuit normally completed through the track for normally holding said train controlling circuit closed, track means for rupturing said holding circuit, and means controlled by the speed of the train for automatically permitting said controlling circuit to be completed regardless of the condition of the holding circuit when the speed of the train falls below a certain rate.

11. A system of train control, comprising: a traffic track, a train, a normally closed train controlling circuit, means including a circuit normally completed through the traffic track for holding said controlling circuit closed, track means for preventing the passage of the current of the holding circuit through the track, means on the train for completing the train controlling circuit when the holding circuit is broken, said means being normally inoperative, and automatic means controlled by the speed of the train for rendering said normally inoperative means operative when the speed of the train falls below a certain rate.

12. A system of train control comprising: automatic train stopping means, restoring means for said train stopping means, a timing means controlling said restoring means, and a speed controlled means controlling said restoring means whereby the restoring means can be actuated only after a certain interval of time and below a predetermined speed.

13. A system of train control comprising: automatic signaling means, automatic train stopping means, restoring means for said signaling means, timing means for controlling said restoring means, restoring means for said train stopping means, timing means for controlling said last-named restoring means, and speed controlled means for controlling said last-named means, whereby the restoring means for said signaling means can operate after a certain interval of time, and whereby the restoring means for said train stopping means can be actuated only after a certain interval of time and below a predetermined speed.

14. A system of train control comprising: a caution signaling means, a danger signaling means, a train stopping means, means for restoring said caution signaling means after a certain interval of time, means for restoring said danger signaling means and said train stopping means after a greater interval of time, means for causing the simultaneous actuation of both said signaling means and said stopping means, and means for preventing the restoration of either of said signaling means until the greater interval of time has elapsed.

15. A system of train control, comprising: a traffic track, a train, a train controlling circuit normally closed, a source of energy in said circuit, an electro-magnetic device normally energized to hold said train circuit closed, means including a circuit completed through the traffic rails for de-energizing said electro-magnetic device, and means controlled by the speed of the train for automatically closing the controlling circuit around the electro-magnetic device when the speed of the train falls below a certain rate.

16. A system of train control, comprising: a traffic track, a train, a train controlling circuit normally closed, a source of energy in said circuit, an electro-magnetic device normally energized to hold said train circuit closed, means including a circuit completed through the traffic rails for de-energizing said electro-magnetic device, means on the train for reënergizing said electro-magnetic device, and means controlled by the speed of the train for automatically closing the controlling circuit around the electro-magnetic device when the speed of the train falls below a certain rate.

17. A system of train control comprising: permissive train controlling means, absolute train controlling means, means for automatically actuating said permissive controlling means alone or for simultaneously actuating said permissive controlling means and said absolute controlling means, means for automatically restoring said permissive controlling means, means for restoring said absolute controlling means, timing means controlling said last-named controlling means, speed controlled means controlling said last-named controlling means, and means, acting when said controlling means are simultaneously actuated, for subjecting both controlling means to the control of said speed controlled means and said timing means.

18. A system of train control comprising: caution signaling means, danger signaling means, train stopping means, means for simultaneously actuating said caution signaling means, said danger signaling means and said train stopping means under certain conditions, speed controlled means for preventing the operation of said train stopping means but permitting the simultaneous operation of said signaling means, and means for restoring said signaling means after a predetermined interval of time.

19. A system of traffic control comprising: a train, train controlling devices, a normally closed train controlling circuit for holding said train controlling devices inoperative, means controlled by track conditions for interrupting said train controlling circuit, and means controlled by the speed of the train including a timing means for placing said train circuit in condition to be completed regardless of the condition of said circuit interrupting means when the speed of the train falls below a certain rate and after a predetermined interval of time.

20. In a system of train control, a primary circuit, a secondary circuit under the control of said primary circuit, train controlling means controlled by said secondary circuit, means for placing said circuits in abnormal condition to operate said train controlling means, speed controlled means for maintaining the secondary circuit in normal condition regardless of the action of the last named means when the train is traveling below a certain speed, and speed controlled means for placing the primary circuit in normal condition at a still lower speed.

21. In a system of train control, a primary circuit, a secondary circuit under the control of said primary circuit, train controlling means controlled by said secondary circuit, means for placing said circuits in abnormal condition to operate said train controlling means, means for preventing the placing of the secondary circuit in abnormal condition when the train is traveling below a certain speed, a branch in said primary circuit, and speed controlled means in said branch for placing said primary circuit in normal condition at a certain still lower rate of speed.

22. In a system of train control, a primary circuit, a secondary circuit under the control of the primary circuit, train controlling means controlled by said secondary circuit, means for placing said circuits in abnormal condition to operate said train controlling means, means for preventing the placing of the secondary circuit in abnormal condition when the train is traveling below a certain speed, a branch in said primary circuit, speed controlled means in said branch, and a manually operable circuit controller in said branch, whereby said primary circuit may be placed in normal condition subject to the control of said speed controlled means.

23. In a system of train control, a primary circuit, a secondary circuit under the control of said primary circuit, train controlling means controlled by said secondary circuit, means for placing said circuits in abnormal condition to operate said train controlling means, a branch in said primary circuit, a branch in said secondary circuit, means in the branch of said secondary circuit for preventing the placing of the secondary circuit in abnormal condition when the train is traveling below a certain rate of speed, and means in the branch of said primary circuit for placing said primary circuit in normal condition at a lower rate of speed.

24. In a system of train control, a normally closed primary circuit, a normally closed secondary circuit under the control of the primary circuit, train controlling means controlled by said secondary circuit, means for rupturing said circuits to operate said train controlling means, speed controlled means for maintaining the secondary circuit in closed condition regardless of the action of the last named means when the train is traveling below a certain speed, and speed controlled means for closing the primary circuit at a still lower speed.

25. In a system of train control, a normally closed primary circuit, a normally closed secondary circuit under the control of the primary circuit, train controlling means controlled by said secondary circuit, means for rupturing said circuits to operate said train controlling means, means for preventing the rupture of the secondary circuit when the train is traveling below a certain speed, a branch in said primary circuit, and speed controlled means in said branch for closing said primary circuit at a lower rate of speed.

26. In a system of train control, a normally closed primary circuit, a normally closed secondary circuit under the control of the primary circuit, train controlling means controlled by said secondary circuit, means for rupturing said circuits to operate said train controlling means, a branch in said primary circuit, a branch in said secondary circuit, means in the branch of said secondary circuit to prevent the rupture of said secondary circuit when the train is traveling below a certain rate of speed, and means in the branch of said primary circuit for closing said primary circuit at a lower rate of speed.

27. In a system of train control, a normally closed primary circuit, a normally closed secondary circuit under the control of the primary circuit, train controlling means controlled by said secondary circuit, means for rupturing said circuits to operate said train controlling means, a branch in said primary circuit, a branch in said secondary circuit, means in the branch of said secondary circuit to prevent the rupture of said secondary circuit when the train is traveling below a certain rate of speed, speed controlled means in the branch of said secondary circuit, and a manually operable circuit closer in said branch whereby said primary circuit may be manually closed subject to the condition of said speed controlled means.

28. A system of train control comprising: a traffic track, a train, a primary circuit including a portion of the track, a secondary circuit controlled by said primary circuit, train controlling means controlled by said secondary circuit, means for placing said circuits in abnormal condition to operate said train controlling means, speed controlled means for maintaining said secondary circuit in normal condition regardless of the action of the last named means when the train is traveling below a certain speed, timing means controlling said primary circuit and speed controlled means coöperating with said timing means for placing the primary circuit in normal condition at a still lower speed and after a predetermined interval of time.

29. A system of train control comprising: a traffic track, a train, a primary circuit normally closed through a portion of the track, a normally closed secondary circuit controlled by said primary circuit, train controlling means controlled by said secondary circuit, track means for rupturing said circuits to operate said train controlling means, speed controlled means for preventing the rupture of the secondary circuit when the train is traveling below a certain speed, a branch in said primary circuit, a timing means controlling said branch and means in said branch coöperating with said timing means for closing said primary circuit at a lower rate of speed and after a predetermined interval of time.

30. A system of train control comprising: a traffic track, a train, a primary circuit normally closed through a portion of the track, a normally closed secondary circuit controlled by said primary circuit, train controlling means controlled by said secondary circuit, a branch in said primary circuit, a branch in said secondary circuit, track means for rupturing said circuits to operate said train controlling means, means in said secondary circuit branch for preventing the rupture of said secondary circuit when the train is traveling below a certain speed, a timing means controlling said primary circuit branch and means in said primary circuit branch coöperating with said timing means for closing said primary circuit at a lower rate of speed and after a predetermined interval of time.

31. In a system of train control, a signal, a resetting means therefor, a train stopping means, and means whereby a defect in the signal resetting means will cause the actuation of the train stopping means.

32. In a system of train control, a signal, a resetting means therefor, a train stopping means, a resetting means therefor, and means whereby a defect in the signal resetting means will cause the actuation of the train stopping means and prevent the actuation of the resetting means for said train stopping means.

33. In a system of train control, a train, train controlling means, signaling means, and recording means on said train, automatic means for simultaneously operating said train controlling means, said signaling means, and said recording means, speed controlled means for preventing the operation of said train controlling means but permitting the operation of said signaling means and recording means when the train is running below a predetermined speed and means for automatically restoring said signaling means after a predetermined interval.

34. A system of train control comprising: train controlling means, means for automatically operating said train controlling means, restoring means for said train controlling means, means for manually actuating said restoring means, and speed controlled and timing mechanism controlling the operation of said manually actuated means.

35. A system of train control comprising: automatic train stopping means, restoring means therefor, speed controlled means for preventing the operation of said automatic train stopping means between a predetermined minimum and a predetermined maximum speed, and means for placing the restoring means in condition to be actuated at said predetermined minimum speed.

36. A system of train control comprising: automatic train stopping means, restoring means therefor, speed controlled means for preventing the operation of said automatic train stopping means between a predetermined minimum and a predetermined maximum speed, timing means, and means controlled by said timing means for placing the restoring means in condition to be actuated at said predetermined minimum speed.

37. A system of traffic control comprising: automatic train stopping means, means for preventing the operation of said train stopping means when the train is traveling below a certain speed, and means controlled by said train stopping means for preventing the exercise of control over the train stopping means by said speed controlled means when the speed has been reduced from a higher to said certain speed by the operation of said train stopping means.

38. A system of traffic control comprising: train controlling means, means for operating said train controlling means, speed controlled means for preventing the operation of said train controlling means below a certain speed, means controlled by said train controlling means for preventing the exercise of control over said train controlling means by said speed controlled means when the speed has been reduced from a higher to said certain speed by the operation of said train controlling means, and means controlled by said train controlling means for restoring the control of said speed controlled means at a lower speed.

39. A system of traffic control comprising: train controlling means, means for operating said train controlling means, speed controlled means for preventing the operation of said train controlling means below a certain speed, means controlled by said train controlling means for preventing the exercise of control over said train controlling means by said speed controlled means when the speed has been reduced by the operation of said train controlling means, restoring means for said train controlling means, and means controlled by said train controlling means for placing the restoring means in condition to be operated at a lower speed.

40. A system of traffic control comprising: a normally closed circuit, train controlling means therein, means for breaking said circuit to operate said train controlling means, means for closing a substitute circuit through said train controlling means around said break when the train is traveling below a certain speed, and means controlled by said train controlling means to break said substitute circuit to prevent the speed controlled means from controlling the train controlling means when the speed is reduced from a higher to said certain speed by the operation of the train controlling means.

41. A system of train control comprising: permissive traffic controlling means, absolute traffic controlling means, restoring means for said permissive controlling means, means for recording the operation of said absolute traffic controlling means, and means controlled by said absolute controlling means for preventing the operation of said restoring means and for causing the operation of said recorder.

42. A system of train control comprising: a fluid pressure actuated brake controlling means, a plurality of conduits for supplying fluid pressure to control said controlling means, automatic means for simultaneously affecting the pressure in each of said conduits to apply the brakes, and means for cutting off communication between one of said conduits and the automatic pressure affecting means.

43. A system of train control comprising: a fluid pressure actuated brake controlling means, a plurality of conduits for supplying fluid pressure to control said controlling means, automatic means for simultaneously affecting the pressure in each of said conduits to apply the brakes, and means for cutting off communication between said conduits and the automatic pressure affecting means.

44. A system of traffic control comprising: a normally closed primary circuit, normally closed secondary circuits controlled thereby, permissive traffic controlling means in one of said secondary circuits, absolute traffic controlling means in one of said secondary circuits, means for rupturing said circuits to selectively actuate said controlling means, timing means for closing one of said secondary circuits to restore said permissive controlling means after a certain interval, and timing means for closing a break in one of said secondary circuits to exercise a control over said absolute controlling means after a greater interval.

45. A system of train control comprising: a fluid pressure actuated brake controlling means, a conduit for supplying fluid pressure to control said controlling means, automatic means for affecting the pressure in said conduit to apply the brakes, a fluid pressure controlled timing device connected with said conduit and operating after a predetermined interval of time to place the automatic means in condition to be restored to normal condition and means for cutting off communication between said conduit and said brake controlling means.

46. A system of traffic control comprising: permissive traffic controlling means, absolute traffic controlling means, means for selectively actuating said permissive traffic controlling means alone or for simultaneously actuating said permissive controlling means and said absolute controlling means, means for restoring said permissive controlling means after a certain interval, means for restoring said absolute controlling means after a greater interval, and means, acting when said controlling means are simultaneously actuated, for preventing the actuation of the restoring means for the permissive controlling means until the restoring means for the absolute controlling means has been actuated.

47. A system of traffic control comprising: circuits, permissive traffic controlling means in one of said circuits, absolute traffic controlling means in another of said circuits, means for affecting said circuits to actuate said permissive controlling means alone or to simultaneously actuate both controlling means, timing means for placing said permissive controlling circuit in normal condition to restore said permissive controlling means after a certain interval, timing means for placing said absolute controlling circuit in normal condition to restore said absolute controlling means after a greater interval, and timing means for affecting said permissive controlling circuit before said first-named restoring means acts when both controlling means have been actuated to prevent the restoration of the permissive controlling means until the restoring means for the absolute controlling means has been actuated.

48. A system of traffic control comprising: a normally closed circuit, permissive traffic controlling means in one of said circuits, absolute traffic controlling means in one of said circuits, means for rupturing said circuits to selectively actuate said controlling means, fluid pressure actuated means for closing said permissive controlling circuit to restore said permissive controlling means after a certain interval, an electro-magnetic device controlled from said permissive controlling circuit for operating said fluid pressure actuated means, fluid pressure actuated means for closing said absolute controlling circuit to restore said absolute controlling means after a longer interval, an electro-magnetic device controlled from said absolute controlling circuit for operating said second-named fluid pressure actuated means, and means controlled by said absolute controlling means to prevent the closing of said permissive controlling circuit by said first-named fluid pressure actuated means.

49. In a system of train control, a train, train controlling means, signaling means, automatic means for simultaneously operating said signaling means and said controlling means, speed controlled means for preventing the operation of said train controlling means but permitting the operation of said signaling means when the train is running below a predetermined speed, and means for automatically restoring said signaling means after a predetermined interval.

50. A system of train control comprising: automatic train stopping means, manually operable restoring means for said train stopping means, timing means controlling said restoring means and speed controlled means controlling said restoring means, whereby the restoring means can be actuated only after a certain interval of time and below a predetermined speed.

In testimony that I claim the foregoing as my own, I have hereto affixed my signature in the presence of two witnesses.

GARDNER B. GRAY.

Witnesses:
GUY P. THURBER,
JOSEPH KNOX STONE.